United States Patent Office 3,098,031
Patented July 16, 1963

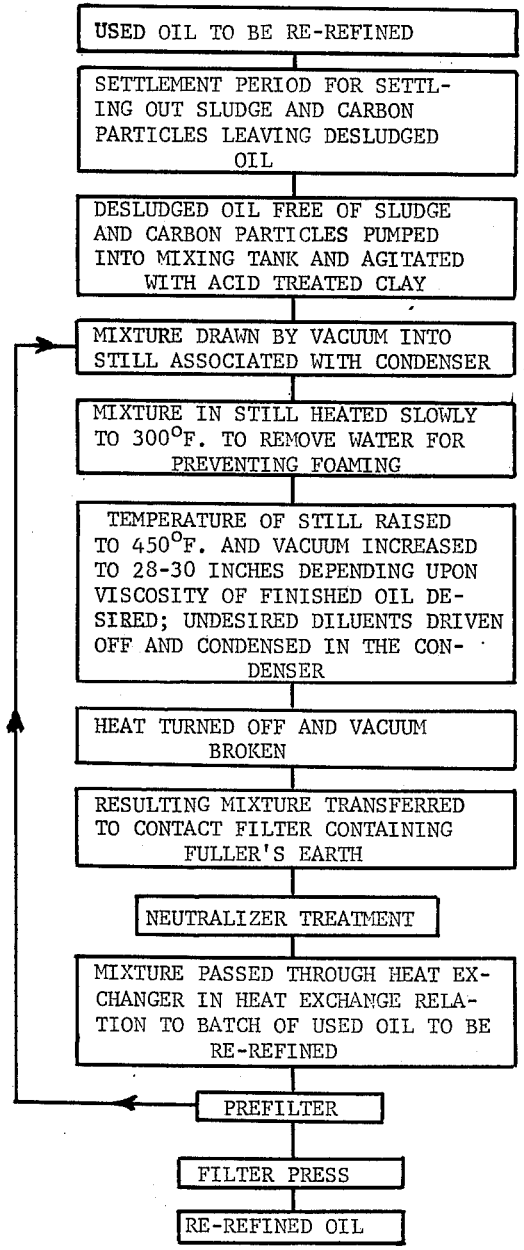

3,098,031
METHOD OF RE-REFINING
Velma Claver Harris, 3621 Belleview,
Kansas City 11, Mo.
Filed Sept. 30, 1958, Ser. No. 764,215
4 Claims. (Cl. 208—183)

My invention relates to the method of re-refining used crankcase oil and, more particularly, to a new method of combining re-refining and filtering methods in the petroleum industry.

It has become accepted practice to re-refine almost all used petroleum oil such as crankcase oil rather than "reclaim" it. Essentially, the difference between reclaiming and re-refining is that re-refining comprises the application of sufficient heat to acid treated used oil to drive off the diluents and then contacting the oil with fuller's earth and passing it through a series of pressure filters to remove the filtering material from the distilled oil, while reclaiming is largely a question of gravity settling and gravity filtering through coarse filtering material such as 60 mesh fuller's earth with only sufficient heat applied to handle the oil.

The steady improvement in the methods of re-refining used crankcase oil is illustrated by the successive United States Letters Patent issued to Aycock and Harris, No. 1,707,671, on April 2, 1929; to Patrick, No. 1,750,350, on March 11, 1930; and to Harris, No. 2,319,599, on May 18, 1943.

The method of the present invention represents an improvement over the prior art teachings in reducing the time and expense of maintenance of re-refining equipment in facilitating the cleansing of the retort system and the prolonging the time of use of the pressure filters between disassembly. The invention is a continuation-in-part of my co-pending application Number 400,917, filed December 29, 1953, now abandoned.

The principal object of my invention is to provide a method of re-refining which employs the steps of acid treating the used oil to separate the carbon and the colloidal metals into a sludge; mixing an acid treated clay with the desludged oil; distilling off the light ends or diluents in a still or retort under a vacuum; condensing the diluents; contacting the distilled oil with fuller's earth, passing the residual oil by cyclic pumping through a heat exchanger, bypassing some of the oil through the still or retort and passing all of the oil into a prefilter cage; and pressure filtering until the desired color is achieved.

The method of my invention has been schematically illustrated by the accompanying flow-chart which will be hereinafter described in more detail.

In practice, I prefer to employ a re-refining apparatus such as disclosed in the United States Letters Patent to Harris, No. 2,319,598, granted May 18, 1943, and a prefilter disclosed in United States Letters Patent No. 2,754,006, granted to me July 10, 1956.

My method employs the present most advanced re-refining procedure of treating the oil to be re-refined with 66 degree Baumé sulphuric acid agitated in an open vessel or mixing tank at room temperature. It will be later apparent that the temperature of the mixing tank may be raised above room temperature. The approximate proportions of the acid to the oil are not more than one gallon of acid to fifty gallons of oil depending upon the contamination. The treated oil is allowed to stand for sufficient period to settle out the sludge and to clear the oil of the carbon particles. The treated oil is then pumped into a mixing tank and an acid treated clay such as "Retrol" is mixed in the oil in proportions of approximately 20 to 22 pounds to each fifty gallons of treated oil. The mixture is then drawn by vacuum into a still or retort having condensing apparatus connected thereto. A partial vacuum is maintained in the still while the mixture is heated relatively slowly at first to remove the water which prevents foaming. As soon as the water has passed off and the temperature in the retort has reached approximately 300° F., the vacuum is increased to between 28 and 30 inches while the heat is continued until the mixture has reached about 450° F., depending upon the viscosity desired of the finished oil. By this time the undesired diluents have been driven off the mixture and have been condensed separately. The heat is turned off, the vacuum broken, and the mixture is then passed into a contact vessel where further treatment is achieved by contacting the mixture with a clay of the type of 200 mesh fuller's earth in the proportions of about eight pounds of clay to each 50 gallons of oil being treated. About ½ a pound of a neutralizer such as an oil insoluble material sold on the open market as "FCDX" is added for each fifty gallons of oil being treated. The mixture in the contact vessel to which the fuller's earth and the neutralizer have been added is deemed to be "contacted" and is at this time at an elevated temperature. It is customary to pass the "contacted" oil through a heat exchanger immersed in a vessel which holds a new batch of oil being acid treated in the mixing tank. This procedure facilitates the chemical reaction in the mixing tank and accelerates the sludging process. It is also customary to bypass part of this "contacted" oil back through the system into the still to "clean" the system and the still of any loose carbon that will be removed by the passing of this "contacted" oil over the carbon deposited in the system by re-refining process.

However, I have discovered a method to vastly improve this cleansing. After the oil has been "contacted" as set forth above, I pass the "contacted" oil into a pre-filter constructed in accordance with the teachings of my patent, Number 2,754,006, referred to above. I then introduce the oil into the cyclic path of the heat exchanger and the still or retort system. I continue to recycle this "contacted" oil through the pre-filter, the heat exchanger, and the retort system until all of the carbon that can be absorbed by this means is removed from the retort system. The oil is then passed to the filter press.

I have found in practice that the cleaner oil passing from the pre-filter through the retort system is able to remove far more carbon from the retort and the pipes in the system than the former passing of the "contacted" oil without use of the pre-filter. As an example of the degree of cleansing of the system, I placed three hundred sixty and three-quarters pounds of reagents and activated clay into the oil during the re-refining process as called for by the Patent Number 2,319,598 referred to above. By introducing my pre-filter into the re-refining system as set forth herein I extracted three hundred thirty-nine pounds of residual cake from the prefilter and three hundred twelve pounds of residual cake from the filter press. Both cakes were extremely dry. The increased weight over original weight of the added material (less the small weight due to oil adhering to the clay) had to be the coke washed out of the system by my new method.

It will be clear that as the residual cake accumulates in the prefilter the oil must pass through this cake to the outside of the filter cage. The cake thus becomes an increasingly effective filter to hold more and more of the loose particles of carbon and clay present in the oil. As the oil thus becomes "cleaner," its adsorptive capabilities increase and it becomes a better cleaning agent as it passes through the system. This decreases the wear on the pumps and moving parts in the system and, in passing to the final filter press substantially "clean" oil, the time between shutting down the filter press for cleaning is substantially increased. I have found in practice that, by my new method as set forth above, the filter press, which has been employed for use in the apparatus of the Patent Number 2,319,598 referred to above, need be dismantled for cleaning after one hundred ten runs whereas formerly ten runs would fill the press. The still or retort need be scraped only one third as often as formerly.

Thus by my invention, I have provided a re-refining method which will remove far more carbon from the retort system and which will increase the useful period of still or retort and the filter press in the re-refining system many times over the methods employed before my new method.

Having described my invention, what I regard as new and desire to protect by Letter Patent is:

1. A method of re-refining used oil comprising the following steps; creating a vacuum in a still, causing a body of used oil to be treated which is under atmospheric pressure to be drawn into the still, vaporizing the diluents from the oil in the still, breaking the vacuum in the still, passing the re-refined oil from said still to a contact vessel, passing the contacted oil to a prefilter, then re-circulating said oil repeatedly in a cyclic path from said prefilter in heat exchange relation to a batch of oil to be re-refined, bypassing a portion of the oil from said cyclic path and discharging it into said still, discharging the oil from the prefilter and the bypassed portion of the oil from the still through the prefilter, and finally passing the oil from the prefilter to a filter press.

2. A process for re-refining used petroleum oil which comprises desludging the oil by acid treatment, mixing activated clay into the desludged oil in the proportions of approximately twenty pounds of clay to fifty gallons of oil, vaporizing diluents from said mixture in a still under vacuum, breaking said vacuum, contacting said mixture in a contact vessel containing 200 mesh fuller's earth in proportions of approximately eight pounds to fifty gallons of oil, adding a neutralizer in the proportions of approximately one-half pound to fifty gallons of oil, passing the contacted oil to a prefilter, and then re-circulating the oil repeatedly in a cyclic path from said prefilter in heat exchange relation to a batch of oil to be re-refined to said contact vessel and back to said prefilter, bypassing a portion of said oil from said cyclic path and discharging it into said still to remove any deposit remaining in said oil, discharging the oil from the prefilter and the bypassed portion of the oil from the still and returning it to the cyclic path, and finally passing said oil from said prefilter to a filter press.

3. The method of re-refining used oil which comprises settling out sludge and carbon from the used oil to provide desludged oil, agitating the desludged oil with acid treated clay, drawing the mixture by vacuum into a still, heating the mixture in the still for preventing foaming at a temperature of the order of 300° F., raising the vacuum in the still and increasing the temperature to a range of the order of 450° F., discontinuing the heating and breaking the vacuum, filtering the resulting mixture, adding a neutralizer to the mixture, passing the mixture through a heat exchanger in heat exchange relation to a batch of used oil to be re-refined, delivering the mixture to the input of a prefilter, recycling a portion of the mixture from the output of the prefilter to the input of the still and delivering the remaining portion of the oil from the output of the prefilter and the recycled portion of the oil to a filter press for securing re-refined oil.

4. The method of re-refining used oil which comprises settling out sludge and carbon from the used oil to provide desludged oil, agitating the remaining desludged oil with acid treating clay, drawing the mixture by vacuum into the intake of a still, heating the mixture in the still to increasing temperatures while increasing the vacuum, discontinuing the heating and breaking the vacuum, filtering the resulting mixture, adding a neutralizer to the mixture, again heating the mixture in a heating cycle and delivering the heated mixture to the intake of a prefilter, bypassing a portion of the output of the prefilter to the intake of the still and recycling the mixture through the still, contact filter, and heating cycle along with the initial desludged oil and discharging the output of the prefilter to a filter press for securing re-refined oil.

References Cited in the file of this patent

UNITED STATES PATENTS

| | | |
|---|---|---|
| 2,025,570 | Clark | Dec. 24, 1935 |
| 2,106,071 | Stanton | Jan. 18, 1938 |
| 2,319,598 | Harris | May 18, 1943 |
| 2,582,401 | Stinson | Jan. 15, 1952 |
| 2,717,256 | McMichael et al. | Sept. 6, 1955 |